United States Patent
Baccash

(10) Patent No.: US 7,730,316 B1
(45) Date of Patent: Jun. 1, 2010

(54) METHOD FOR DOCUMENT FINGERPRINTING

(75) Inventor: Jonathan Baccash, Sunnyvale, CA (US)

(73) Assignee: Fatlens, Inc., Mountain View, CA (US)

( * ) Notice: Subject to any disclaimer, the term of this patent is extended or adjusted under 35 U.S.C. 154(b) by 915 days.

(21) Appl. No.: 11/525,312

(22) Filed: Sep. 22, 2006

(51) Int. Cl.
*G06F 21/00* (2006.01)

(52) U.S. Cl. ...................... 713/176; 382/225

(58) Field of Classification Search ........... 380/28; 713/176; 382/181, 224–225, 228, 229; 707/2–3, 707/5
See application file for complete search history.

(56) References Cited

U.S. PATENT DOCUMENTS

| | | | |
|---|---|---|---|
| 6,119,124 A * | 9/2000 | Broder et al. | 707/103 R |
| 6,240,409 B1 * | 5/2001 | Aiken | 707/4 |
| 6,487,555 B1 | 11/2002 | Bharat et al. | |
| 6,658,423 B1 * | 12/2003 | Pugh et al. | 707/102 |
| 7,562,186 B2 * | 7/2009 | Li et al. | 711/112 |
| 2005/0108339 A1 * | 5/2005 | Gleeson et al. | 709/206 |
| 2007/0085716 A1 * | 4/2007 | Bar-Yossef et al. | 341/87 |

OTHER PUBLICATIONS

Andrei Z. Broder, Identifying and filtering near-duplicate documents, In Combinatorial Pattern Matching, 11th Annual Symposium, pp. 1-10, Jun. 2000.

* cited by examiner

*Primary Examiner*—Gilberto Barron, Jr.
*Assistant Examiner*—Shaun Gregory
(74) *Attorney, Agent, or Firm*—William L. Botjer

(57) ABSTRACT

Methods and computer program products for creating sketches of a document, which are compared with sketches of other documents, in order to determine the documents' degree of similarity. A sketch is a digest of information from random locations within a document. A document is divided into a set of shingles. Each shingle is converted into a set of fingerprints. A sketch is determined based on one bit fingerprints thus created. In order to create additional sketches of the document, a new set of fingerprints are created by randomization techniques.

14 Claims, 3 Drawing Sheets

METHOD FOR DOCUMENT FINGERPRINTING

BACKGROUND

The invention relates to searching for information on the Internet. More specifically, the invention relates to methods for storing document fingerprints to determine the degree of similarity between documents.

Search engines have enabled easy access to an unprecedented amount of information on all topics. Search engines include Internet crawler programs, which browse the World Wide Web to create copies of documents that are browsed. These copies are used by search engines to provide search results.

When an Internet crawler program browses the World Wide Web, many duplicate and near-duplicate documents are identified. For example, a web page may be available on multiple Uniform Resource Locators (URLs). Further, a website may be hosted on multiple host names. Near-duplicate documents have a small amount of varying content. Identification of duplicate and near-duplicate documents helps in optimizing search results returned by a search engine. The identification of duplicate and near-duplicate documents may also be used to filter a set of documents browsed by the Internet crawler program, thereby saving time and bandwidth.

Various algorithms are implemented in the Internet crawler programs and search engines to identify duplicate and near-duplicate documents. These algorithms generate multiple sketches of documents. A sketch is a digest of information from random locations within a document. A sketch may also be defined as a combination of fingerprints of the document. The sketch of a document may be compared with the sketches of other documents, in order to determine the degree of similarity between the documents or to find groups of near-duplicate documents.

To generate a sketch, a document may be split into a stream of tokens. Thereafter, sets of tokens may be grouped to form shingles. Each shingle of the document may be hashed into an integer value. The integer value is referred to as a fingerprint of the document. A set of fingerprints may be created by this process. A pre-determined number of fingerprints from the set of fingerprints may be grouped and stored as the sketch of the document. Further, additional sketches may be created by mapping a set of fingerprints to a new set of fingerprints by means of randomization techniques. For example, a random number generator may be used along with the set of fingerprints, to create the new set of fingerprints. Thereafter, a pre-determined number of fingerprints from the new set of fingerprints may be grouped and stored as another sketch of the document. Sketches of a group of documents may be compared to determine groups of duplicate or near-duplicate documents.

However, one or more of the algorithms available require a large amount of storage space for storing the sketches of a document. For example, if a fingerprint of a document requires eight bytes of storage space, a sketch comprises fourteen fingerprints, and a total of six sketches are stored for each document, the storage space required for one document is 672 bytes. Therefore, the storage space required for the millions of documents on the World Wide Web is very large.

In light of the foregoing discussion, there is a need for a new algorithm that requires less storage space for document fingerprints and also determines the similarity between documents accurately.

SUMMARY

An object of the invention is to create sketches of a document that require less storage space.

Another object of the invention is to identify duplicate and near-duplicate documents on the Internet accurately.

Yet another object of the invention is to group duplicate and near-duplicate documents, in order to filter a set of results returned by a search engine.

Yet another object of the invention is to group duplicate and near-duplicate documents, in order to filter a set of documents browsed by an Internet crawler program.

In accordance with the objects of the invention, various embodiments of the invention provide a method and computer program product for creating sketches of a document, such that the sketches require less storage space.

A set of shingles is created from a document. Thereafter, a first set of integers is created by hashing each shingle, after which, a second set of integers is generated by using the first set of integers. One or more integers are selected from the second set of integers, and a sketch of the document is created, based on the one or more integers. Additional sketches of the document may be created, based on a new set of integers, which may be generated recursively by using the second set of integers. A set of sketches of the document is compared with a set of sketches of another document, in order to determine the degree of similarity between the documents. As a result, duplicate and near-duplicate documents are identified, which may be grouped together.

Various embodiments of the invention create sketches, which are a combination of one-bit fingerprints of a document. One or more conventional algorithms store a 64-bit integer as a sketch of the document. Therefore, various embodiments of the invention create sketches of a document that occupy less storage space than conventional algorithms. Further, duplicate and near-duplicate documents are identified with the same accuracy as conventional algorithms. Identifying and grouping duplicate and near-duplicate documents enables the accurate filtration of a set of results returned by a search engine. Further, grouping of duplicate and near-duplicate documents enables the filtration of the set of documents browsed by an internet crawler program.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

Various embodiments of the invention provide a method and computer program product for creating one or more sketches of a document. A sketch may be defined as a digest of information from random locations within a document. A sketch may also be defined as a combination of one or more fingerprints of the document. The one or more sketches of a document are compared with one or more sketches of another document, in order to determine the similarity between the documents. Documents having a pre-defined number of sketches in common may be considered as duplicate or near-duplicate documents.

Figure 1:
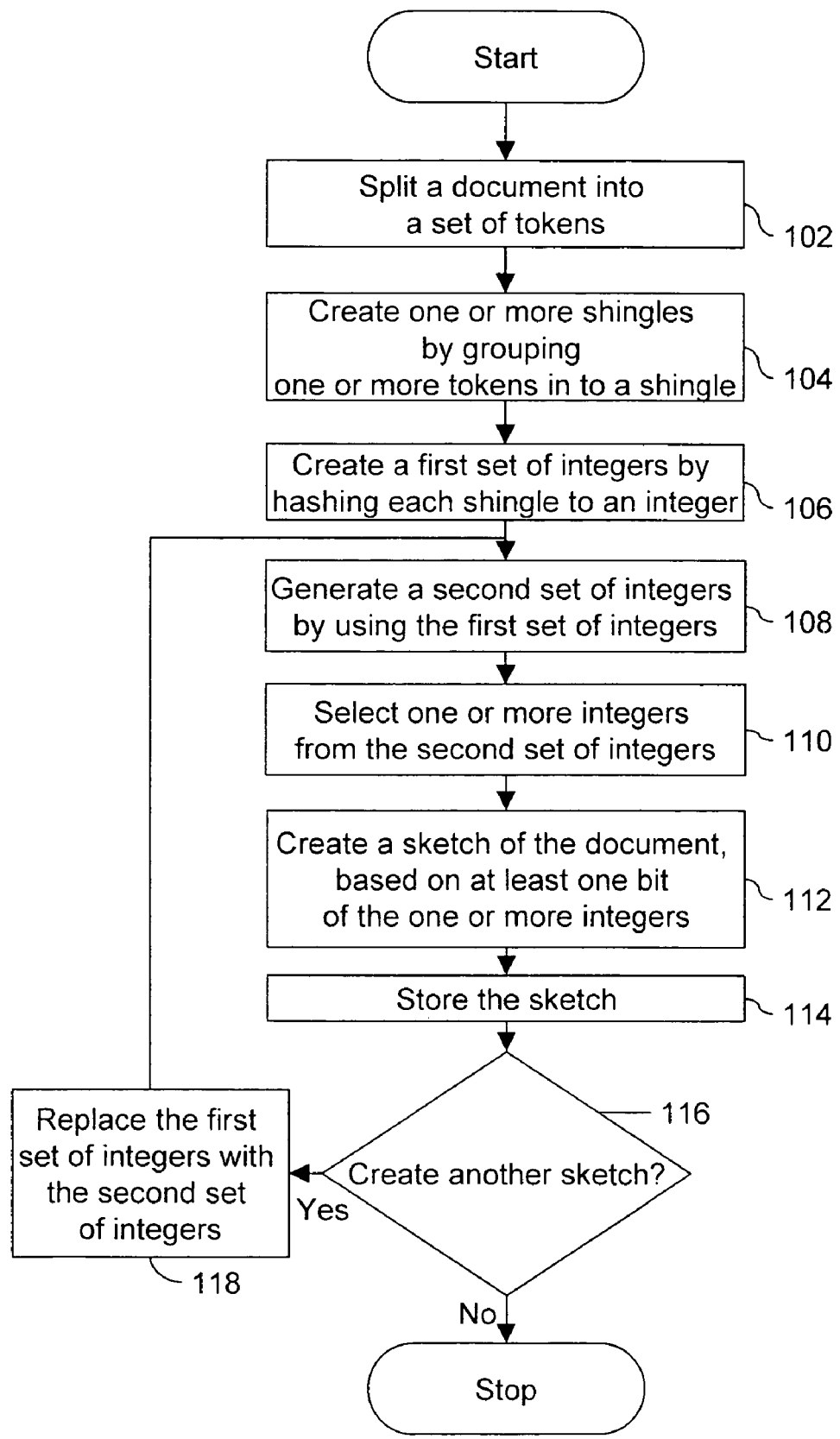
FIG. 1 is a flowchart depicting a method for creating one or more sketches of a document, in accordance with an embodiment of the invention.

FIG. 1 is a flowchart depicting a method for creating one or more sketches of a document, in accordance with an embodiment of the invention. At step 102, a document is split into a set of tokens. In an embodiment of the invention, each character in the document may be considered a token. At step 104, one or more shingles are created by grouping one or more tokens from the set of tokens into a shingle. A shingle is a set of contiguous terms in a document. For example, a continuous set of eight tokens may be considered as a shingle. The document may thereby be divided into shingles comprising eight tokens each.

Thereafter, at step 106, a first set of integers are created by hashing each shingle from the one or more shingles to an integer value. In various embodiments of the invention, a 64-bit Rabin hash may be performed on each shingle, in order to convert each shingle into an integer value, other suitable hashing techniques may also be used. At step 108, a second set of integers is generated by using the first set of integers. In various embodiments of the invention, the second set of integers may be created by using randomization techniques. For example, a random number generator seeded with the first set of integers may be used in order to generate the second set of integers.

At step 110, one or more integers from the second set of integers are selected. In various embodiments of the invention, a pre-determined number of the smallest integers may be selected from the second set of integers. The pre-determined number of the smallest integers may be decided based on the size of the sketch that is desired. For example, to create a 4-bit sketch of the document, four of the smallest integers may be selected from the second set of integers. At step 112, a sketch is created, based on at least one bit of the one or more integers. In various embodiments of the invention, one or more bits of the one or more integers determine one or more bits of the sketch. In an embodiment of the invention, the sketch may be determined, based on a set of one-bit fingerprints taken from the one or more integers. Step 112, in accordance with an embodiment of the invention, has been elaborated in detail in conjunction with an example of the embodiment below. At step 114, the sketch is stored. At step 116, a check is performed to determine whether another sketch of the document needs to be created. If another sketch of the document is to be created, step 118 is performed. At step 118, the first set of integers is replaced with the second set of integers. Thereafter, steps 108, 112, 114, 116 and 118 are repeated, in order to create additional sketches of the document.

In various embodiments of the invention, a token may be one or more characters, a set of one or more bits of data, and the like. A document may be a text file, an image file, a web page, and the like.

Figure 2:
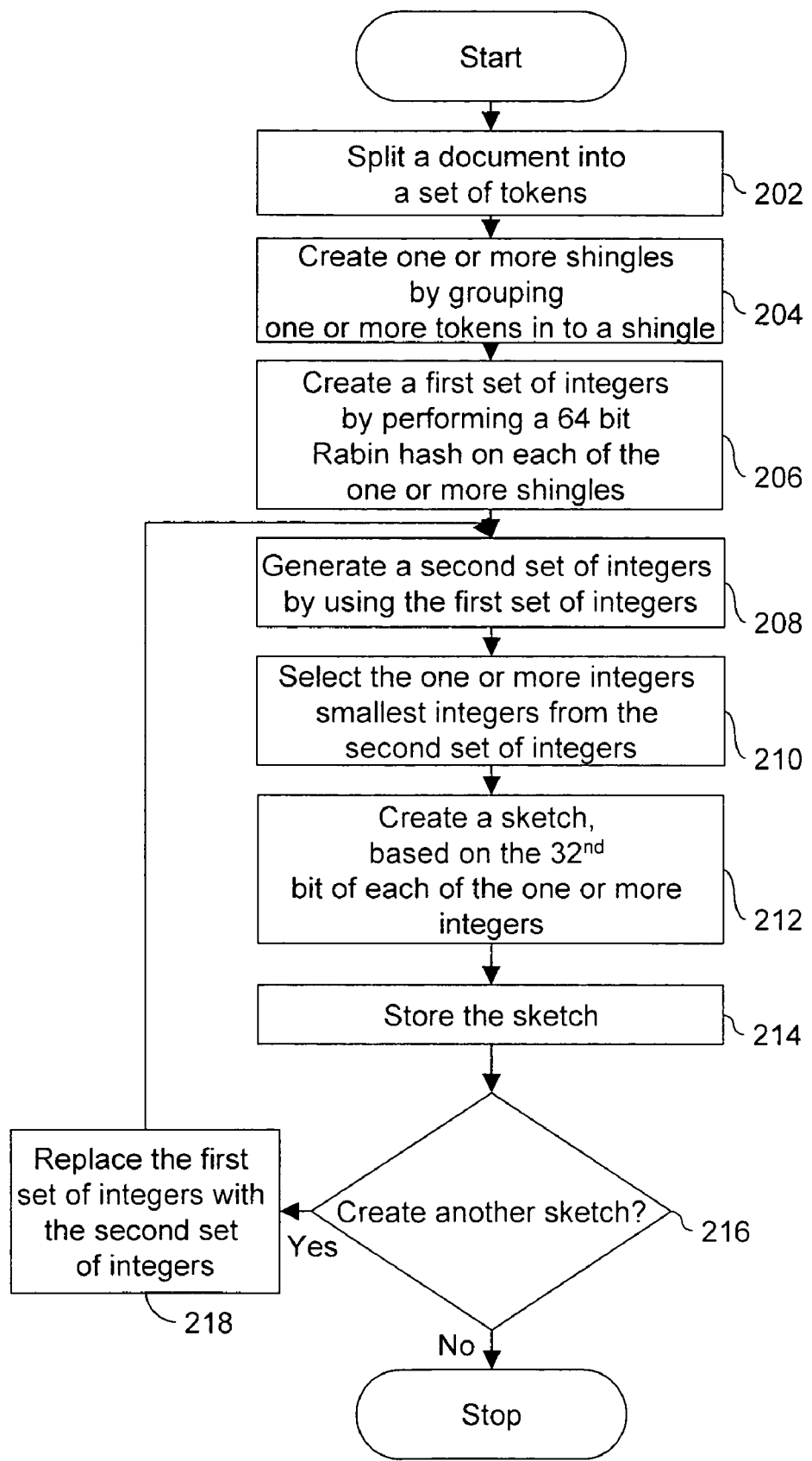
FIG. 2 is a flowchart depicting a method for creating one or more sketches of a document, in accordance with another embodiment of the invention.

FIG. 2 is a flowchart depicting a method for creating one or more sketches of a document, in accordance with another embodiment of the invention. At step 202, the document is split into a set of tokens. In an embodiment of the invention, each character in the document may be considered a token. At step 204, one or more shingles are created by grouping one or more tokens into a shingle. For example, a continuous set of eight token may be considered as a shingle. The document may thereby be divided into shingles comprising eight token each. Thereafter, at step 206, a first set of integers is created by performing a 64-bit Rabin hash on each shingle. At step 208,
a second set of integers is generated by using the first set of integers. In various embodiments of the invention, the second set of integers may be created by a random but deterministic permutation of the first set of integers. For example, a random number generator, seeded with the first set of integers, may be used to generate the second set of integers. This ensures that each integer from the first set of integers is less likely to be present in the second set of integers. At step 210, the one or more smallest integers from the second set of integers are selected. In various embodiments of the invention, the number of smallest integers selected may be equal to the length of the sketch to be created for the document. In one embodiment of the invention, the second set of integers is sorted in ascending order, in order to select the one or more smallest integers. At step 212, a sketch of the document is created, based on the $32^{nd}$ bit of each of the one or more integers. The $32^{nd}$ bit is selected as it is hashed properly in Rabin hash. In various embodiments of the invention, one or more bits of the sketch may be determined, based on the $32^{nd}$ bit of the smallest integers. For example, a first bit of the sketch may be determined, based on the $32^{nd}$ bit of the first integer from the one or more integers, wherein the first bit is the least significant bit in the sketch. Similarly, a second bit of the sketch may be determined, based on the $32^{nd}$ bit of the second integer from the one or more integers, and the like, to create the sketch. At step 214, the sketch is stored.

At step 216, a check is performed to determine whether another sketch of the document needs to be created. In various embodiments of the invention, a pre-determined number of sketches are created for a document. The pre-determined number may be selected based on storage space limitations. If another sketch of the document needs to be created, step 218 is performed. At step 218, the first set of integers is replaced with the second set of integers. Thereafter, steps 208, 210, 212, 214, 216 and 218 are repeated to create additional sketches of the document. In various embodiments of the invention, it is ensured that the same number of integers is selected from the second set of integers while the above-mentioned steps are repeated. This ensures that the additional sketches of the document are of the same length. Further, the same bit is selected from each integer while creating additional sketches. For example, for each sketch, the $32^{nd}$ bit is selected from each integer. Therefore, each bit of the sketch is determined, based on the one-bit fingerprints. As a result, instead of storing an entire integer as a fingerprint of the document, the method stores one bit of the integer. Thereby, the storage space required for a sketch of the document is reduced.

Figure 3:
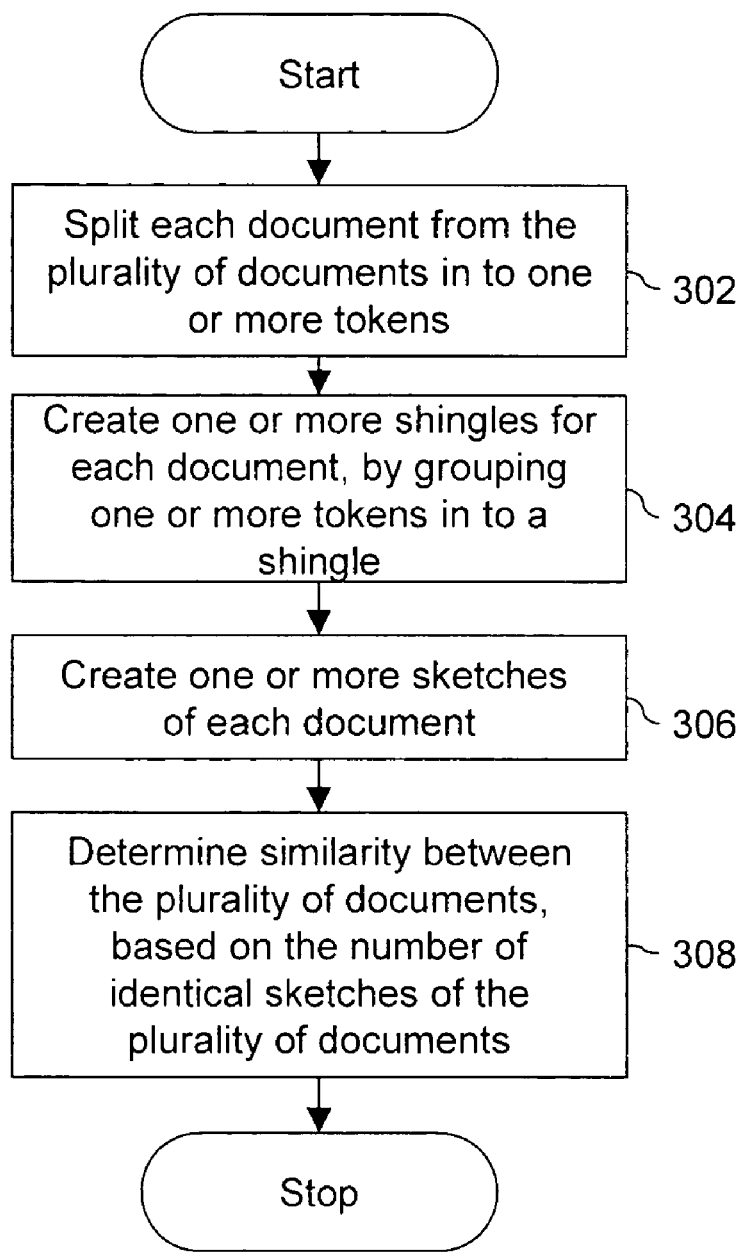
FIG. 3 is a flowchart depicting a method for determining similarity between a plurality of documents, in accordance with an embodiment of the invention.

FIG. 3 is a flowchart depicting a method for determining the similarity between a plurality of documents, in accordance with an embodiment of the invention. At step 302, each of the plurality of documents is split into a set of tokens. At step 304, one or more shingles are created for each of the plurality of documents, by grouping one or more tokens of each document into a shingle. Thereafter, at step 306, one or more sketches of each document are created and stored. The one or more sketches may be created by methods described in conjunction with FIGS. 1 and 2. At step 308, the similarity between the plurality of documents is determined, based on the number of identical sketches of the plurality of documents. In various embodiments of the invention, duplicate and near-duplicate documents may be determined, based on the similarity between the documents. Duplicate and near-duplicate documents may be grouped together, in order to filter a set of results returned by a search engine. Duplicate and near-duplicate documents may also be grouped together, in order to filter a set of documents browsed by an Internet crawler program.

In various embodiments of the invention, documents may be considered duplicate documents if all their sketches are identical. Documents may be considered near-duplicate documents if they share a pre-defined number of identical sketches. In various embodiments of the invention, documents with the pre-defined number of sketches in common may be identified and grouped together by using a union-find algorithm.

The method described above is explained with the following example of an embodiment of the invention:

A set of three documents may be encountered by a search engine as results of a search query, or by an Internet crawler program while browsing the World Wide Web. The three documents are text files:

Document One: abcdefghijklmnop
Document Two: abcdefghijklmnqp
Document Three: xdfijfoisjdfsjio Each character is considered as a token, and a set of eight tokens is selected as a shingle. A total of two sketches are created for each document, wherein each sketch is four bits in length. Documents are considered near duplicate if they have one sketch in common.

By grouping sets of eight tokens each, Document One is divided into the following shingles:
abcdefgh
bcdefghi
cdefghij
defghijk
efghijkl
fghijklm
ghijklmn
hijklmno
ijklmnop Similarly, Document Two is divided into the following nine shingles:
abcdefgh
bcdefghi
cdefghij
defghijk
efghijkl
fghijklm
ghijklmn
hijklmnq
ijklmnqp Document Three is divided into the following nine shingles:
xdfijfoi
dfijfois
fijfoisj
ijfoisjd
jfoisjdf
foisjdfs
oisjdfsj
isjdfsji
sjdfsjio Each token of each of the one or more shingles is represented by the American Standard Code for Information Interchange (ASCII) value of the token. Hence, the first shingle of Document One is represented as the set {97, 98, 99, 100, 101, 102, 103, 104}. Thereafter, for each document, a first set of integers is created by computing a 64-bit Rabin hash of each of the one or more shingles. Each shingle is thereby hashed to an integer value. This is illustrated by the following pseudo-code:

Integer Value=0
For i=1 to 8 do:
Integer Value=(Integer Value*256+ASCII value of Token [i]) modulus 36028797018963913
Set First Integer[i]=Integer Value As a result, the first set of integers for Document One include:
First Integer [1]=276938305667443 42
First Integer [2]=279764409366893189
First Integer [3]=282589988167042036
First Integer [4]=285415669671 90883
First Integer [5]=288241457673 39730
First Integer [6]=291067245674 88577
First Integer [7]=293893033367637424
First Integer [8]=296718821 67786271
First Integer [9]=299544609679351 18

A second set of integers is generated from the first set of integers by using randomization techniques. A random number generator, seeded with the first set of integers, is used to generate the second set of integers. This is illustrated by the following equation:

$$\text{Second Integer} = ((\text{First Integer} * 6364136223846793005) + 9223372036854775783)) \quad (1)$$

The second set of integers created for Document One include:
Second Integer [1]=15431069426452671 41
Second Integer [2]=3864883191593417800
Second Integer [3]=6186659440541568459
Second Integer [4]=8508435689489719118
Second Integer [5]=10830211938437869777
Second Integer [6]=13151988187386020436
Second Integer [7]=15473764436334171095
Second Integer [8]=17795540685282321754
Second Integer [9]=16705728605 20920797

The following is a binary representation of the second set of integers:
Second Integer [1]=0001010101101010001101111001011010101110110011110110101011000101
Second Integer [2]=0011010110100010110100101100100100100101010011011011110001001000
Second Integer [3]=0101010111011011011011011111101110011011110011000000110111001011
Second Integer [4]=0111011000010100000010010010111000010010010010010010111110100111 0
Second Integer [5]=1001011001001100101001000110000010001000110010001011000011010001
Second Integer [6]=1011011010000101001111111001001011111111010001110000001001010100
Second Integer [7]=1101011010111101110110101100010101110101110001010101001111010111
Second Integer [8]=1111011011110110011101011110111111101100010000111010010101011010
Second Integer [9]=0001011001011100010001001010100110001011100000111110110110111 01

Thereafter, the second set of integers is sorted and the four smallest integers from the second set of integers are selected, since a four bit-length sketch is to be created The four integers selected from the second set of integers include:

Integer
[1]=00010101011010100011011110010110101011101100111101101010110001 01

Integer
[2]=000101110010111100010001001010100110001011000001111101101101110 1

Integer
[3]=0011010110100010110100101100100100101010011011011110001001000

Integer
[4]=010101011101101101101101111110111001101111001100000011011100101 1

In a 64-bit Rabin hash, the $32^{nd}$ bit is well hashed. Therefore, each bit of the sketch is determined, based on the $32^{nd}$ bit of the four integers. The first bit of sketch is set to 1, since the $32^{nd}$ bit of the first integer is 1. The $32^{nd}$ bit of Integer [2] is 0. As a result, the second bit of sketch is not set. In this manner, a sketch of four bits is created, based on the $32^{nd}$ bit of the four integers selected from the second set of integers. The sketch created of Document One is represented in binary as 1001 or the integer nine.

In order to create the second sketch of Document One, the first set of integers is replaced with the second set of integers. Thereafter, a new second set of integers is created from the first set of integers. A random number generator seeded with the first set of integers is used to create the new second set of integers. Thereafter, the four smallest integers from the new second set of integers are selected. The four integers selected include:

Integer
[1]=000100110011110101011001101010010001010011111001110100001000111 1

Integer
[2]=00101110000100110101001000001111111010001101110100100001100101 10

Integer
[3]=01001000111010010100101001110110101111001100000001110010100111 01

Integer
[4]=01100011011111101000010110110110010000010100011110000111010010 0

The four bits of the second sketch are determined, based on the $32^{nd}$ bit of the four integers mentioned above, in a manner described earlier. As a result, the second sketch of Document One is determined to be 1110 in binary or the integer 14. Therefore, the sketches of Document One are represented by the list {9,14}.

Similarly, two sketches each are created of Document Two and Document Three. The two sketches of Document Two and Document Three are represented by the lists {5,14} and list {13,3}, respectively.

Since Document One and Document Two match in their second sketch, the two documents are considered near-duplicate documents. However, Document Two and Document Three do not match in any of their two sketches. Hence, they are not considered near-duplicate documents. Similarly, Document One and Document Three are not considered near-duplicate documents since neither of their two sketches match.

One or more of conventional algorithms store the four integers selected from the second set of integers as a sketch of a document. As a result, the storage space required for two sketches of each document is 64 bytes. However, in the method described above, each sketch is four bits long, and therefore, the total storage space required to store two sketches of each document is one byte. In general, a sketch of 'F' bits is created by the method, whereas one or more conventional algorithms create a sketch of 'f' integers (f*64 bits).

The accuracy of the method described above is explained by considering the resemblance values of the three documents. The resemblance value of two documents is defined as the ratio of the number of identical shingles of the two documents to the total number of distinct shingles of the two documents. Hence, Document One and Document Two have a resemblance value of 7/11. Similarly, Document Two and Document Three have a resemblance value of 0/18. Document Three and Document One have a resemblance value of 0/18. Since Document One and Document Two have a higher resemblance value, the probability that they are considered near-duplicate documents is higher than that Document Two and Document Three, as well as Document One and Document Three, are considered near duplicate.

The method described above has numerous advantages, as explained below with the help of an example of a conventional algorithm.

In case of one or more conventional algorithms, a set of two documents is taken and a total of six sketches are created for each of the two documents. A set of 14 of the smallest fingerprints of the document are sorted and stored as a sketch of the document. Each fingerprint is a 64-bit integer. Therefore, the storage space required for each document is 672 bytes. Various embodiments of the invention take into consideration one-bit fingerprints to determine a sketch of a document. Therefore, a sketch of 14 bits is created for a total of six sketches created for each document and a set of 14 fingerprints comprising a sketch. Therefore, the storage space for each document is 84 bits.

The accuracy in identifying the grouping of duplicate and near-duplicate documents is compared with the help of the following example:

A total of eight sketches are created of each document, wherein each sketch is 64-bit long. Two documents are considered to be near duplicate documents if they have one sketch in common. Therefore, the storage space required for fingerprinting each document is 64 bytes.

The probability that two documents are considered as near duplicates by the method described above is illustrated in the following table against various resemblance values common to the two documents:

| Resemblance | Probability |
| --- | --- |
| 0.50 | 8.07255e−08 |
| 0.70 | 0.000243139 |
| 0.90 | 0.263592 |
| 0.95 | 0.828555 |
| 0.98 | 0.997434 |

If the resemblance between the two documents is 0.98, the probability that the two documents will be considered to be near-duplicate documents is 0.997434.

The number of sketches to be created for each document may be determined, based on the table above. In general, as the length of a sketch is increased, a higher resemblance value is required to produce the same probability that a document is identified as a near-duplicate document. Two documents are considered as near-duplicate documents if a pre-defined number of sketches of the two documents are identical. Similarly, as the pre-defined number is increased, a higher resemblance value is required to identify the two documents as near duplicates. If the number of sketches created for each document is increased, identifying near-duplicate documents is easier. However, an increase in the number of sketches increases the storage-space requirement for fingerprinting each document. Therefore, an optimal number of sketches are created for each document, based on the table illustrated above, and the constraints elaborated above.

In the case of one or more conventional algorithms, a set of six sketches is created for each document. Each sketch comprises 14 fingerprints, wherein each fingerprint is a 64-bit integer. Therefore, the storage space required for fingerprinting each document is 672 bytes. The two documents are considered near-duplicate documents if they share more than two sketches in common. The probability that the two documents will be considered as near-duplicate documents is illustrated against various resemblance values in the following table:

| Resemblance | Probability |
| --- | --- |
| 0.50 | 5.58703e−08 |
| 0.70 | 0.000677596 |
| 0.90 | 0.415051 |
| 0.95 | 0.878638 |
| 0.98 | 0.995673 |

It is clearly visualized in the table that the probability that the two documents will be considered near duplicates is 0.995673 if the two documents have a resemblance of 0.98.

The probability that the two documents will be considered near-duplicate documents is similar for both the methods described earlier, as well as in the conventional algorithm, for values of resemblance that are closer to 1. However, the method described in the invention, requires less storage space for each document than the conventional algorithm.

In the case of one conventional algorithm, the probability that one fingerprint is identical between two documents may be given by the resemblance value of the two documents, for instance, 'r'. If a sketch of a document comprises a total of fingerprints, the probability that the sketch matches totally with a sketch of the other document is given by the value of $r^f$.

In various embodiments of the invention, a sketch comprises one-bit fingerprints, selected indirectly from the hash of a shingle. A sketch comprises a pre-determined number of such 1-bit fingerprints, for instance, 'F'. The probability that a shingle of a document matches a shingle of another document is shown by the resemblance value 'r'. Therefore, the probability of a fingerprint match is 1. If the shingle does not match any shingle of the other document, the probability that the fingerprint matches is ½. Therefore, the probability that a 1-bit fingerprint matches is given by the equation:

$$\text{Probability} = r + (1-r)/2 \qquad (2)$$

Hence, the probability that the entire sketch of the document matches is given by the following equation:

$$\text{Probability} = (r + (1-r)/2)^F \qquad (3)$$

The following table illustrates the storage space required to store the fingerprints of a document by using the method described above, as well as by using one or more conventional algorithms, wherein the probability that an entire sketch is identical between two documents is less than 0.5:

| Resemblance | Storage space required (in bits) (Method described in the invention) | Storage space required (in bits) (One or more conventional algorithms) |
| --- | --- | --- |
| 0.700 | 5 | 128 |
| 0.800 | 7 | 256 |
| 0.900 | 14 | 448 |
| 0.950 | 28 | 896 |
| 0.980 | 69 | 2240 |
| 0.990 | 139 | 4416 |

It is clear from the table that as the resemblance value increases, one or more of the conventional algorithms require approximately 32 times the storage space that is required by the method described, for the same probability that an entire sketch of one document is identical to a sketch of another document.

In light of the discussion above, various embodiments of the invention provide an algorithm for accurately identifying near-duplicate documents from a set of documents. Further, the storage space required for each document is reduced. The invention provides a method, which is easily manageable, to group duplicate and near-duplicate documents. This enables extracting better results from a search engine. The set of documents browsed by an Internet crawler program may also be reduced, thereby saving time and bandwidth.

The method for creating sketches of a document, and for identifying groups of similar documents, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer also comprises a microprocessor. The microprocessor is connected to a communication bus. The computer also includes a memory. The memory may include Random Access Memory (RAM) and Read Only Memory (ROM). Further, the computer system comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit enables the computer to connect to other databases and the Internet through an I/O interface, and also allows the transfer and reception of data from other databases. The communication unit may include a modem, an Ethernet card, or any similar device that enables the computer system to connect to databases and networks such as LAN, MAN, WAN, and the Internet. The computer system facilitates inputs from a user through an input device that is accessible to the system through an I/O interface.

The computer system executes a set of instructions that are stored in one or more storage elements, in order to process input data. The storage elements may also hold data or other information, as desired, and may be in the form of an information source or a physical memory element present in the processing machine.

The set of instructions may include various commands that instruct the processing machine to perform specific tasks such as the steps that constitute the method of the present invention. The set of instructions may be in the form of a software program. Further, the software may be in the form of a collection of separate programs, a program module with a larger program or a portion of a program module, as in the present invention. The software may also include modular programming in the form of object-oriented programming. Processing of input data by the processing machine may be in response to user commands, results of previous processing, or a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

What is claimed is:

1. A method for creating one or more sketches of a document, the document comprising one or more tokens, the one or more tokens being used to create one or more shingles, the one or more sketches of the document being created to determine the similarity of the document with other documents, the method comprising the steps of:
   a) converting the one or more shingles to a first set of integers;
   b) generating a second set of integers by using the first set of integers;
   c) selecting one or more integers from the second set of integers;
   d) creating a sketch based on the $32^{nd}$ bit of each of the one or more integers;
   e) repeating steps b, c, d, and e for creating additional sketches of the document, wherein the first set of integers is replaced with the second set of integers; and
   f) storing the sketch and the additional sketches;
   wherein the stored sketch and the additional sketches are used to compare the similarity of the document with other documents, and wherein the steps of the method are performed by a microprocessor.

2. The method of claim 1, wherein the step of converting the one or more shingles to a first set of integers comprises the step of hashing each of the one or more shingles to an integer.

3. The method of claim 1, wherein the step of converting the one or more shingles to a first set of integers comprises the step of computing a 64-bit Rabin hash of each of the one or more shingles.

4. The method of claim 1, wherein the second set of integers is generated by using a random number generator seeded with the first set of integers.

5. The method of claim 1, wherein the step of selecting one or more integers from the second set of integers comprises the step of identifying the one or more smallest integers.

6. A computer program product for use with a stored program computer, the computer program product comprising a computer storage medium having a computer readable program code embodied therein for creating one or more sketches of a document, the document comprising one or more tokens, the one or more tokens being used to create one or more shingles, the one or more sketches of the document being created to determine the similarity of the document with other documents, the computer readable program code performing the steps of:
   a) converting the one or more shingles to a first set of integers;
   b) generating a second set of integers by using the first set of integers;
   c) selecting one or more integers from the second set of integers;
   d) creating a sketch based on $32^{nd}$ bit of each of the one or more integers;
   e) repeating steps b, c, d, and e for creating additional sketches of the document, wherein the first set of integers is replaced with the second set of integers; and
   f) storing the sketch and the additional sketches;
   wherein the stored sketch and the additional sketches are used to compare the similarity of the document with other documents, and wherein the computer program product interacts with a microprocessor for executing the computer readable program code.

7. The computer program product of claim 6, wherein the computer readable program code performing the step of converting the one or more shingles to a first set of integers further comprises the computer readable program code performing the step of hashing each of the one or more shingles to an integer.

8. The computer program product of claim 6, wherein the computer readable program code performing the step of converting the one or more shingles to a first set of integers further comprises the computer readable program code performing the step of computing a 64 bit Rabin hash of each of the one or more shingles.

9. The computer readable program product of claim 6, wherein the computer readable program code performing the step of generating a second set of integers using the first set of integers further comprises the computer readable program code performing the step of generating the second set of integers by using a random number generator seeded with the first set of integers.

10. The computer program product of claim 6, wherein the computer readable program code performing the step of selecting one or more integers from the second set of integers further comprises the computer readable program code performing the step of identifying the one or more smallest integers.

11. The method of claim 1, wherein the sketches are created from one bit fingerprints.

12. The method of claim 1, wherein the document is at least one of a text file, an image file and a web page.

13. The computer program product of claim 6, wherein the sketches are created from one bit fingerprints.

14. The computer program product of claim 6, wherein the document is at least one of a text file, an image file and a web page.

* * * * *